United States Patent
Momtahan

(10) Patent No.: US 10,007,072 B1
(45) Date of Patent: Jun. 26, 2018

(54) OPTICAL COUPLING SYSTEM HAVING A PERTURBED CURVED OPTICAL SURFACE THAT REDUCES BACK REFLECTION AND IMPROVES MODE MATCHING IN FORWARD OPTICAL COUPLING

(71) Applicant: Foxconn Interconnect Technology Limited, Grand Cayman (KY)

(72) Inventor: Omid Momtahan, Palo Alto, CA (US)

(73) Assignee: Foxconn Interconnect Technology Limited, Grand Cayman (KY)

( * ) Notice: Subject to any disclaimer, the term of this patent is extended or adjusted under 35 U.S.C. 154(b) by 0 days. days.

(21) Appl. No.: 15/445,723

(22) Filed: Feb. 28, 2017

(51) Int. Cl.
  G02B 6/26 (2006.01)
  G02B 6/42 (2006.01)
  G02B 6/14 (2006.01)
  G02B 6/32 (2006.01)

(52) U.S. Cl.
  CPC ............ *G02B 6/4208* (2013.01); *G02B 6/14* (2013.01); *G02B 6/32* (2013.01); *G02B 6/4206* (2013.01); *G02B 6/4214* (2013.01)

(58) Field of Classification Search
  CPC .... G02B 6/14; G02B 6/1228; G02B 6/12007; G02B 6/125; G02B 6/28; B82Y 20/00
  See application file for complete search history.

(56) References Cited

U.S. PATENT DOCUMENTS

| | | | |
|---|---|---|---|
| 6,530,697 B1 | 3/2003 | Johnson et al. | |
| 6,668,113 B2 | 12/2003 | Togami et al. | |
| 6,807,336 B2 | 10/2004 | van Haasteren | |
| 6,822,794 B2 | 11/2004 | Coleman et al. | |
| 6,961,489 B2 | 11/2005 | Cox et al. | |
| 7,149,383 B2 | 12/2006 | Chen | |
| 7,184,627 B1 | 2/2007 | Gunn, III et al. | |
| 7,206,140 B2 | 4/2007 | Wong et al. | |
| 7,457,343 B2 | 11/2008 | Vancoille | |
| 7,783,146 B2 * | 8/2010 | Blauvelt | G02B 6/12002 385/30 |
| 8,270,787 B2 * | 9/2012 | Sumetsky | G02B 6/305 385/28 |
| 8,385,005 B2 | 2/2013 | Smith | |
| 8,442,365 B2 | 5/2013 | Graham | |
| 2006/0098292 A1 | 5/2006 | Wong et al. | |
| 2016/0124149 A1 | 5/2016 | Chen et al. | |

* cited by examiner

*Primary Examiner* — Jennifer Doan
(74) *Attorney, Agent, or Firm* — Thomas | Horstemeyer, LLP

(57) ABSTRACT

An optical coupling system and method are provided for coupling light from a light source into an optical waveguide that reduce back reflection of light onto the light source and provide controlled launch conditions that increase forward optical coupling efficiency. The optical coupling system comprises at least one curved optical surface having perturbations formed therein over at least a portion of the curved optical surface that intersects an optical pathway. The perturbations have a lateral width and a maximum height that are preselected to improve forward optical coupling efficiency and to decrease back reflection of the light beam from the optical waveguide end face onto the light source aperture. The perturbations improve forward optical coupling efficiency by creating a complex light beam shape that is preselected to match a spatial and angular distribution of a plurality of light modes of the optical waveguide.

20 Claims, 11 Drawing Sheets

OPTICAL COUPLING SYSTEM HAVING A
PERTURBED CURVED OPTICAL SURFACE
THAT REDUCES BACK REFLECTION AND
IMPROVES MODE MATCHING IN
FORWARD OPTICAL COUPLING

TECHNICAL FIELD OF THE INVENTION

The invention relates to optical communications modules and, more particularly, to an optical coupling system for use in an optical communications module that reduces back reflection of the light beam being launched into the end face of an optical waveguide while improving mode matching between the modes of the light beam and the modes of the optical waveguide.

BACKGROUND OF THE INVENTION

In optical communications networks, optical communications module (i.e., optical transceiver, transmitter and receiver modules) are used to transmit and receive optical signals over optical waveguides, which are typically optical fibers. An optical transceiver module includes a transmitter side and a receiver side. On the transmitter side, a laser light source generates a laser light beam and an optical coupling system receives the laser light beam and optically couples the laser light beam onto an end face of an optical fiber. The laser light source typically comprises one or more laser diodes that generate light beams of a particular wavelength or wavelength range. A laser diode driver circuit of the transmitter side outputs electrical drive signals that drive the laser diode. The optical coupling system typically includes one or more reflective, refractive and/or diffractive elements that couple the modulated light beam onto the end face of the optical fiber. On the receiver side, optical signals passing out of the end face of the optical fiber are optically coupled by an optical coupling system onto a photodiode, such as a P-intrinsic-N(P-I-N) diode, for example, by an optical coupling system of the transceiver module. The photodiode converts the optical signal into an electrical signal. Receiver circuitry of the receiver side processes the electrical signal to recover the data. The transmitter and receiver sides may use the same optical coupling system or they may use separate optical coupling systems.

In high-speed data communications networks (e.g., 10 Gigabits per second (Gb/s) and higher), certain link performance characteristics, such as relative intensity noise (RIN), for example, are dependent on properties of the laser light source and on the design of the optical coupling system. In most optical fiber applications, a trade-off exists between forward optical coupling efficiency of laser light from the laser light source into the end face of the optical fiber and back reflection of laser light from the end face of the optical fiber onto the laser light source. Back reflection increases RIN and degrades the performance of the laser light source. As optical communications links utilize increasingly higher data rates, reducing RIN becomes increasingly important. In optical links that use multimode laser light sources and multimode optical fibers (MMFs), forward optical coupling efficiency is decreased by mode mismatching between the modes of the laser light source and the modes of the MMF.

The traditional approaches for managing back reflection include using an edge-emitting laser diode with a fixed-polarization output beam in conjunction with an optical isolator, or using an angular offset launch in which either an angled fiber in a pigtailed transceiver package or a fiber stub is used to direct the light from the light source onto the end face of the link fiber at a non-zero degree angle to the optical axis of the link fiber. These approaches have advantages and disadvantages. The optical isolator may not have the desired effect if used with a laser light source that has a variable-polarization output beam, such as a vertical cavity surface emitting laser diode (VCSEL). Using an angled fiber pigtail or fiber stub can increase the complexity and cost of the transceiver packaging. Also, such approaches may not be suitable for applications where a standard optical fiber needs to be used.

A need exists for an optical coupling system for coupling a laser light beam onto an end face of an optical fiber that enables efficient coupling to many fiber modes while also reducing back reflections, thereby reducing RIN.

SUMMARY OF THE INVENTION

The inventive principles and concepts are directed to an optical coupling system for coupling a light beam onto an end face of an optical waveguide and a method. The optical coupling system comprises a curved optical surface positioned along an optical pathway of the optical coupling system and a plurality of perturbations disposed on an outer side of the curved optical surface. A light beam generated by a light source and propagating along an optical pathway of the optical coupling system in a first direction is incident on the curved optical surface having the perturbations formed therein. Each perturbation has a localized refractive effect on a portion of the light beam that is incident on the curved optical surface to form a respective light beam portion at a predetermined plane. The perturbations are shaped, sized and positioned such that a predetermined aggregated refractive effect of partially or fully overlapping all of the respective light beam portions at the predetermined plane forms a complex light beam shape at the predetermined plane that is different in shape from respective shapes of each of the respective light beam portions. The complex light beam shape is preselected to match a spatial and an angular distribution of a plurality of light modes of the optical waveguide.

In accordance with an embodiment, an optical coupling system for use in an optical communications module is provided that comprises a curved optical surface positioned along an optical pathway of the optical coupling system and having a plurality of perturbations formed there. The curved optical surface has a base and an outer side. A light beam generated by a light source and propagating along the optical pathway in a first direction is incident on the curved optical surface. Each perturbation has a localized refractive effect on a portion of the light beam that is incident on the curved optical surface to form a respective light beam portion at a predetermined plane. The perturbations are shaped, sized and positioned such that a predetermined aggregated refractive effect of partially or fully overlapping all of the respective light beam portions at the predetermined plane forms a complex light beam shape at the predetermined plane that is different in shape from respective shapes of each of the respective light beam portions. The complex light beam shape is preselected to reduce a likelihood that light reflected from an end face of an optical waveguide coupled to the optical communications system will be incident on an aperture of the light source.

In accordance with an embodiment, the method comprises:
  with a light source, producing a light beam; and
  with an optical coupling system, receiving the light beam and guiding the light beam in a first direction along an optical pathway of the optical coupling system onto a curved optical surface of the optical coupling system. A plurality of perturbations are disposed on an outer side of the curved optical surface, where each perturbation has a localized refractive effect on a portion of the light beam that is incident on the curved optical surface to form a respective light beam portion at a predetermined plane. The perturbations are shaped, sized and positioned such that a predetermined aggregated refractive effect of partially or fully overlapping all of the respective light beam portions at the predetermined plane forms a complex light beam shape at the predetermined plane that is different in shape from a respective shape of each of the respective light beam portions. The complex light beam shape is preselected to match a spatial and angular distribution of a plurality of light modes of an optical waveguide into which the optical coupling system couples the complex light beam. These and other features and advantages of the invention will become apparent from the following description, drawings and claims.

DETAILED DESCRIPTION OF AN ILLUSTRATIVE EMBODIMENT

Figure 1:
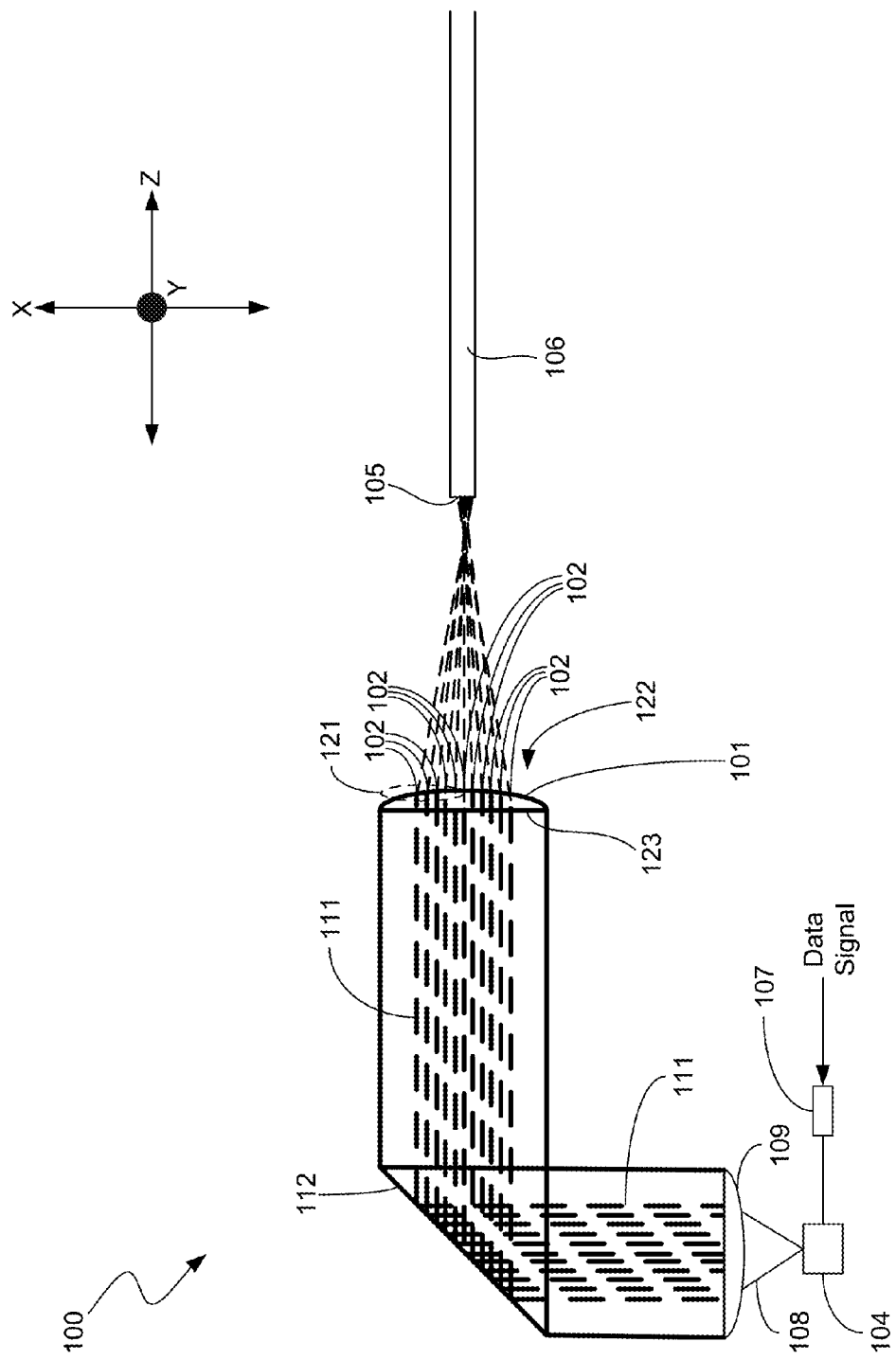
FIG. 1 illustrates a side view of a portion of an optical coupling system in accordance with a representative embodiment having a curved optical surface in which a plurality of perturbations are formed.

In accordance with representative, or exemplary, embodiments described herein, an optical coupling system and method are provided for use in an optical communications module that improve forward optical coupling efficiency through better mode matching and reduce back reflection. The optical coupling system has at least one curved optical surface having perturbations formed therein over at least a portion of the curved optical surface such that the perturbations intersect an optical pathway of the optical coupling system. The perturbations are shaped, sized and positioned to modify the phase of the laser light beam in a predetermined manner to control the launch of the laser light beam onto the end face of the optical waveguide in a predetermined manner that improves mode matching and reduces back reflection. Illustrative, or representative, embodiments will now be described with reference to FIGS. 1-12, in which like reference numerals represent like features, components or elements.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature. More particularly, the word "representative" as used herein indicates one among several examples, and it must be understood that no undue emphasis or preference is being directed to the particular example being described. It should also be understood that the word "representative," as used herein, is intended to be non-exclusionary and non-limiting in nature. More particularly, the word "representative," as used herein, indicates one among several examples, and no undue emphasis or preference is being directed to the particular example being described.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "an element" includes one element and plural elements. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The terms "approximately" or "about" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element. Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than connectors (e.g., bonding materials, mechanical fasteners, etc.).

Figure 2:
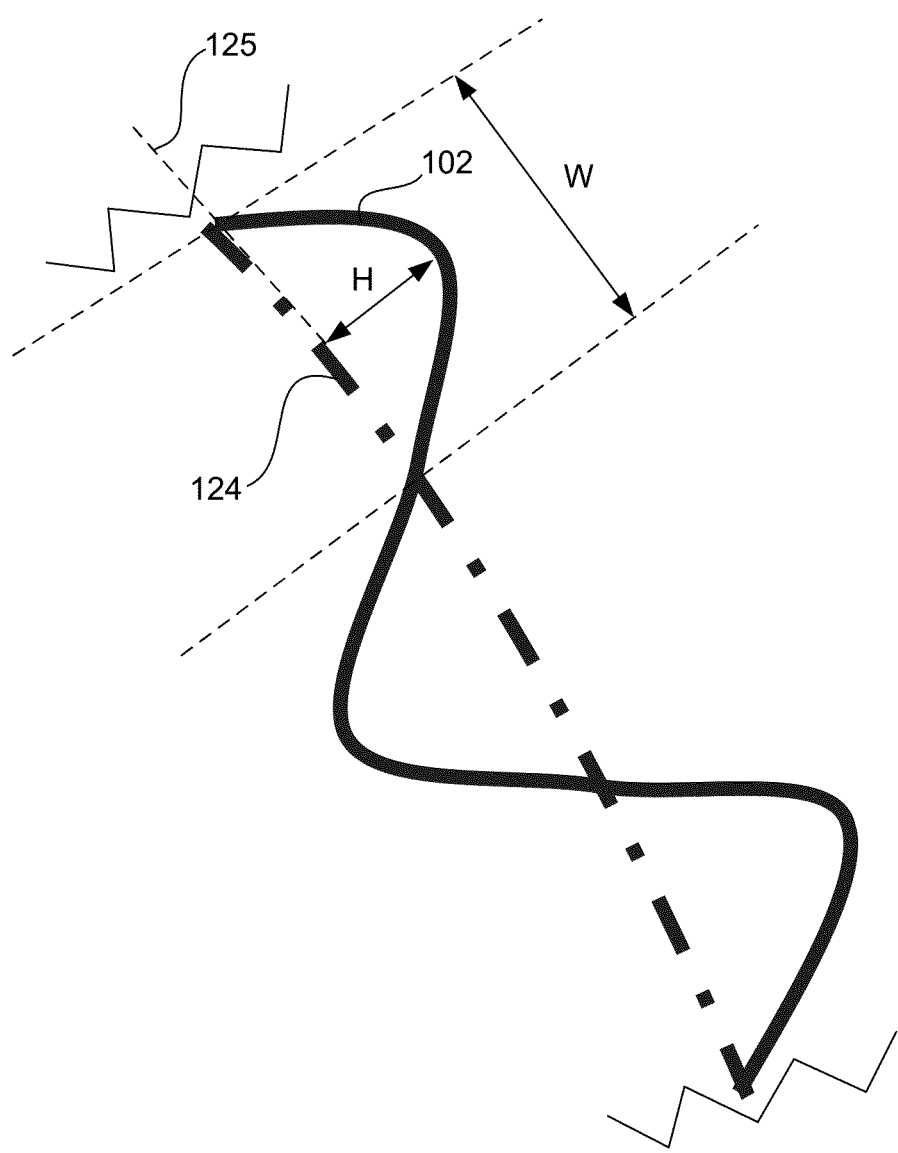
FIG. 2 illustrates a cross-sectional side view of the portion of the curved optical surface having the perturbations formed therein shown in the dashed circle labeled with reference numeral 121 in FIG. 1.

FIG. 1 illustrates a side view of an optical coupling system 100 in accordance with a representative embodiment having a curved optical surface 101 in which a plurality of perturbations 102 are formed. FIG. 2 illustrates a cross-sectional side view of the portion of the curved optical surface 101 shown in the dashed circle labeled with reference numeral 121 in FIG. 1. The term "curved optical surface," as that term is used herein, denotes a surface that has curvature and that performs refractive operations on light of an operating wavelength, k, transmitted by an optical communications module (not shown), such as an optical transmitter, transceiver or receiver module. The term "perturbation," as that term is used herein, denotes a structural variation in an outer side of the curved optical surface 101 that has a width that ranges from 60λ to 400λ and a height that ranges from 0 to 5λ. The curved optical surface 101 having the perturbations 102 formed therein is referred to hereinafter as the "perturbed curved optical surface 101."

The optical coupling system 100 optically couples a laser light beam emitted by a laser light source 104 onto an end face 105 of an optical fiber 106. As will be described below in more detail with reference to FIG. 2, each of the perturbations 102 has a width and a height that are preselected to achieve a localized sag profile that provides a localized refractive effect on a respective portion of a laser light beam 111 passing through the respective perturbation 102. The localized refractive effect provided by each perturbation 102 produces a localized modification to the phase of the portion of a laser light beam passing through the perturbation 102. The aggregate optical effect of the perturbations 102 is a predetermined modification of the phase of the laser light beam 111 at a preselected plane that provides a launch condition for the laser light beam 111 onto the end face 105 of the optical fiber 106 that increases mode matching and reduces back reflection, thereby improving RIN.

The laser light source 104 may be, for example, a vertical cavity surface emitting laser diode (VCSEL) or an edge-emitting laser diode, although the inventive principles and concepts are not limited to using any particular type of light source with the optical coupling system and method. For exemplary purposes, it is assumed herein that the light source 104 is a laser light source. As one of the goals of the inventive principles and concepts is to increase mode matching between the modes of the laser light source 104 and the modes of the optical fiber 106, the inventive principles and concepts are well suited for cases in which the laser light source 104 is a multimode laser light source and the optical fiber is a multimode optical fiber (MMF). However, the inventive principles and concepts also are not limited with respect to the type of optical waveguide that is used with the optical coupling system 100.

In accordance with this representative embodiment, a laser light source driver circuit 107 receives a data signal at its input and converts the data signal into a modulated current or voltage signal that drives the laser light source 104, causing it to emit a modulated optical signal 108. The inventive principles and concepts are not limited with respect to the type laser drive circuit or the modulation scheme that are used for this purpose. In accordance with this representative embodiment, the modulated optical signal 108 is a diverging optical signal that is collimated, or nearly collimated, by a refractive lens 109 of the optical coupling system 100 to produce a collimated, or nearly collimated, laser light beam 111. A reflector 112, which may be, for example, a total internal reflection (TIR) lens or a surface having a reflective coating thereon, receives the collimated laser light beam 111 and turns it, or reflects it, by a predetermined non-zero-degree angle, which is a 90° angle in this example, and directs the light beam 111 toward the perturbed curved optical surface 101.

In FIG. 1, the optical coupling system 100 is shown with reference to an X, Y, Z Cartesian coordinate system. The perturbed curved optical surface 101, which is an outer surface of a refractive focusing lens 122 in this example, receives the collimated, or nearly collimated, laser light beam 111 propagating in the Z-direction and couples the laser light beam 111 onto the end face 105 of the optical fiber 106. Each of the perturbations 102 of the perturbed curved optical surface 101 receives a light beam portion of the collimated laser light beam 111 and operates on it locally to vary the phase of the respective light beam portion. The aggregate refractive effect of the local phase variations of all of the respective light beam portions results in the laser light beam having a preselected phase distribution at a preselected plane that is in front of, behind or on the end face 105 of the optical fiber 106, depending on the desired launch condition. The preselected phase distribution of the laser light beam 111 at the preselected plane is tailored to ensure that one or more modes of the laser light beam 111 match one or more modes of the optical fiber 106 to thereby improve forward optical coupling while also reducing back reflection of laser light into the aperture, or active region (not shown), of the laser light source 104. Examples of preselected phase distributions that achieve these goals will be described below in more detail.

Ideally, the phase distribution achieved by the perturbed curved optical surface 101 is preselected to ensure that all modes of the laser light beam 111 are matched to respective modes of the optical fiber 106. Ideally, the preselected phase distribution achieved by the perturbed curved optical surface 101 also prevents any back-reflected light from being coupled into the aperture of the laser light source 104. Achieving ideal mode matching and ideal back-reflection prevention may not always be practical. In some cases, there may be some degree of trade-off between achieving ideal mode matching and achieving ideal back-reflection prevention. In such cases, the perturbed curved optical surface 101 will typically be designed and manufactured to simultaneously achieve a suitable level of mode matching and a suitable level of back-reflection prevention. In applications where back-reflection prevention is not a significant concern, the perturbed curved optical surface 101 will typically be designed and manufactured to achieve an ideal, or nearly ideal, level of mode matching. Similarly, in applications where mode matching is not a significant concern, the perturbed curved optical surface 101 will typically be designed and manufactured to achieve an ideal, or nearly ideal, level of back-reflection prevention.

With reference again to FIG. 1, in accordance with this representative embodiment, the perturbed curved optical surface 101 is an outer surface of a refractive focusing lens 122 having a base 123, which is flat in this representative embodiment. Even with the perturbations 102 formed in the curved optical surface 101, the overall profile of the refractive focusing lens 122 is retained such that the lens 122 maintains the properties of a refractive focusing lens. In addition, however, the size, shape and arrangement of the perturbations 102 in the curved optical surface 101 produces the aforementioned aggregate refractive effect that causes the laser light beam 111 to have a preselected phase distribution at a preselected plane that achieves desired levels of mode matching and back-reflection prevention. Thus, the refractive focusing lens 122 is a hybrid lens in that it provides the refractive effect of a typical refractive focusing lens that causes the laser light beam 111 to converge in a predetermined manner to a focal point while also locally varying the phases of the respective light beam portions as they pass through the respective perturbations 102. The aggregate refractive effect is to provide the laser light beam 111 with a preselected phase distribution at a preselected plane. As indicated above, the preselected plane may be in front of, behind or on the end face 105 of the optical fiber 106, depending on the intended or desired launch condition.

With reference to FIG. 2, in accordance with this representative embodiment, the perturbations 102 correspond to a sinusoidal function that extends in the X- and Y-directions to form an M-by-N array of the perturbations 102, where M is a positive integer that is greater than or equal to 2 and corresponds to the number of rows of perturbations 102 and N is a positive integer that is greater than or equal to 2 and corresponds to the number of columns of perturbations 102. Each perturbation 102 has a width, W, that corresponds to the period of the sinusoidal function and that ranges from 60λ to 400λ, where λ is the operating wavelength in air of the laser light source 104. The dashed curve 124 in FIG. 2 represents the profile of the curved optical surface 101 of the refractive focusing lens 122 shown in FIG. 1 without the perturbations 102 formed therein. Each perturbation 102 has a maximum height, H, that corresponds to the maximum distance in between the lens profile represented by the dashed curve 124 and the perturbation 102 in a direction normal to a tangent 125 to the dashed curve 124. The maximum height H ranges from 0 to 5λ.

Figure 3:
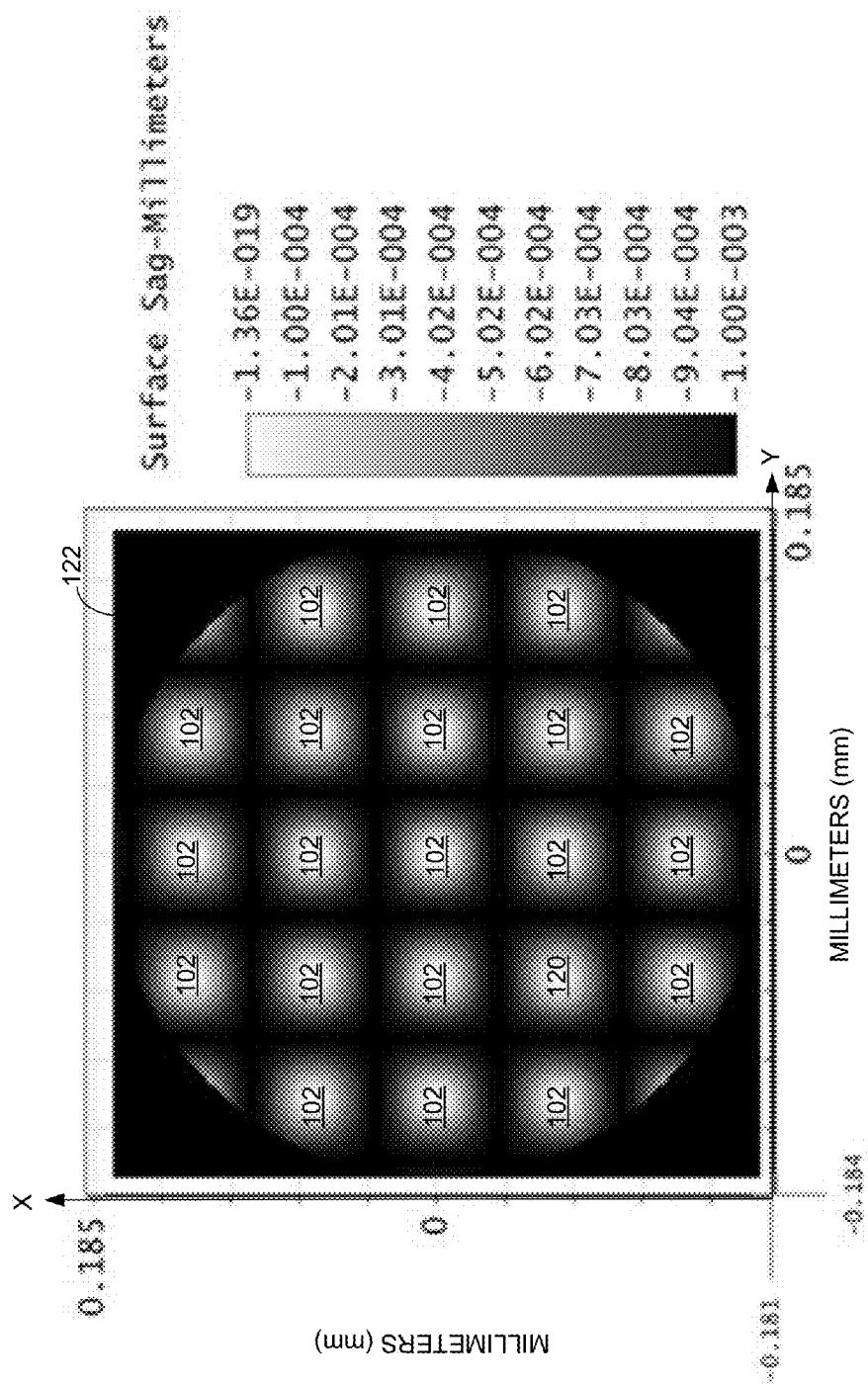
FIG. 3 illustrates a plan view of the perturbations on the refractive focusing lens shown in FIG. 1 in accordance with a representative embodiment having sag values that are represented by brightness and darkness for an M-by-N array of the perturbations.

FIG. 3 illustrates a plan view of the perturbations on the refractive focusing lens 122 shown in FIG. 1 in accordance with a representative embodiment having sag values that are represented by brightness and darkness for the M-by-N array of perturbations 102. A sag scale on the right side of the drawing page relates the sag values to brightness and darkness. The sag value corresponds to the perturbation from the original sag of the lens 122. The brightest features in FIG. 3 correspond to the points of maximum height H of each perturbation 102 and the darkest features correspond to points that are half way in between adjacent points of maximum height H. It can be seen in FIG. 3 that the perturbations 102 are arranged in rows and columns that extend in the Y- and X-directions, respectively, to form the M-by-N array of perturbations 102 in the curved optical surface 101. In accordance with this representative embodiment, the M-by-N array of perturbations 102 is symmetric relative to the center of the refractive focusing lens 122, although it is not necessary for the M-by-N array of perturbations 102 to be symmetric about the center of the refractive focusing lens 122. Also, in accordance with this representative embodiment, the M-by-N array of perturbations 102 extends over the entire curved optical surface 101 of the refractive focusing lens 122. As indicated above, however, the perturbations 102 only need to extend over the portion of the curved optical surface 101 that intersects the optical pathway of the optical coupling system 100.

Figure 4:
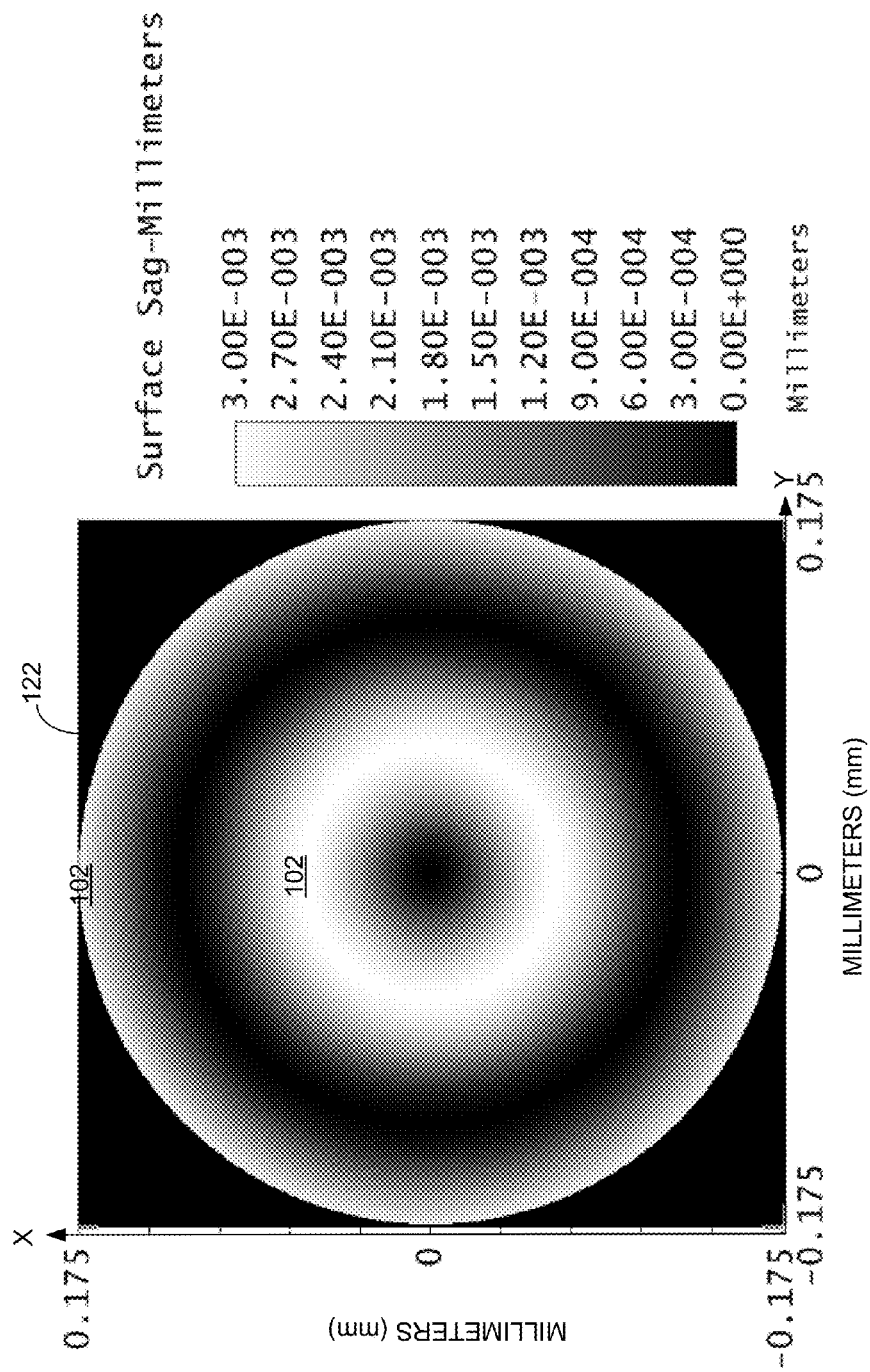
FIG. 4 illustrates a plan view of the perturbations on the refractive focusing lens shown in FIG. 1 in accordance with another representative embodiment having sag values that are represented by concentric rings that vary in brightness.

FIG. 4 illustrates a plan view of the perturbations on the refractive focusing lens 122 shown in FIG. 1 in accordance with another representative embodiment having sag values that are represented by concentric rings that vary in brightness. In accordance with this representative embodiment, the perturbations 102 formed in the curved optical surface 101 are concentric rings that are symmetric about a center of the refractive focusing lens 122 and extend from the center of the refractive focusing lens 122 to the edge of the curved optical surface 101. A sag scale on the right side of the drawing page relates the sag values to brightness and darkness. The sag value corresponds to the perturbation from the original sag of the lens 122. The brightest features in FIG. 4 correspond to the points of maximum height H of each ring-shaped perturbation 102 and the darkest features correspond to points that are half way in between adjacent ring-shaped perturbations 102. The perturbations 102 shown in FIG. 4 are identical to the perturbations 102 shown in FIG. 2 except that the perturbations 102 shown in FIG. 4 are arranged in a pattern of concentric rings rather than in an M-by-N array.

Figure 5:
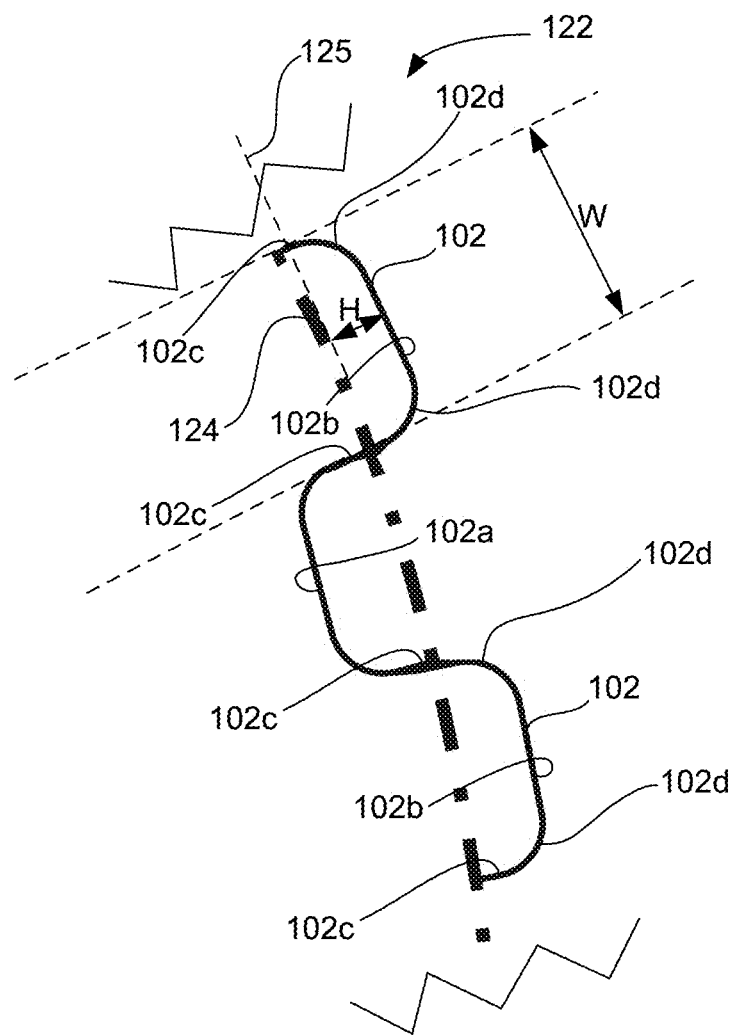
FIG. 5 illustrates a cross-sectional side view of the portion of the curved optical surface shown in the dashed circle labeled with reference numeral 121 in FIG. 1 in accordance with another representative embodiment.

FIG. 5 illustrates a cross-sectional side view of the portion of the curved optical surface 101 shown in the dashed circle labeled with reference numeral 121 in FIG. 1 in accordance with another representative embodiment. In accordance with this representative embodiment, the perturbations 102 have substantially flat indented and protruding surfaces 102a and 102b, respectively, relative to the dashed curve 124 representing the profile of the curved optical surface 101 of the refractive focusing lens 122 shown in FIG. 1 without the perturbations 102 formed therein. The perturbations 102 have side surfaces 102c that are substantially perpendicular to the substantially flat indented and protruding surfaces 102a and 102b, respectively. The perturbations 102 have curved transitioning surfaces 102d that provide relatively smooth transitions between the substantially flat indented and protruding surfaces 102a and 102b, respectively, and the side surfaces 102c. Each perturbation 102 has a width W that ranges from 60λ to 400λ and a maximum height H that ranges from 0 to 5λ. The perturbations 102 only need to extend over the portion of the curved optical surface 101 that intersects the light beam 111, but may extend over the entire curved optical surface 101.

The size, shape and arrangement of the perturbations 102 in the curved optical surface 101 shown in FIG. 5 produces the aforementioned aggregate refractive effect that causes the laser light beam 111 to have a preselected phase distribution at a preselected plane that achieves desired levels of mode matching and back-reflection prevention. As indicated above, the refractive focusing lens 122 comprising the perturbed curved optical surface 101 is a hybrid lens in that it provides the refractive effect of a typical refractive focusing lens that causes the laser light beam 111 to converge in a predetermined manner to a focal point while the perturbations 102 locally vary the phases of the respective light beam portions as they pass through the respective perturbations 102. The aggregate refractive effect is to provide the laser light beam 111 with a preselected phase distribution at a preselected plane that may be in front of, behind or on the end face 105 of the optical fiber 106, depending on the intended or desired launch condition.

Figure 6:
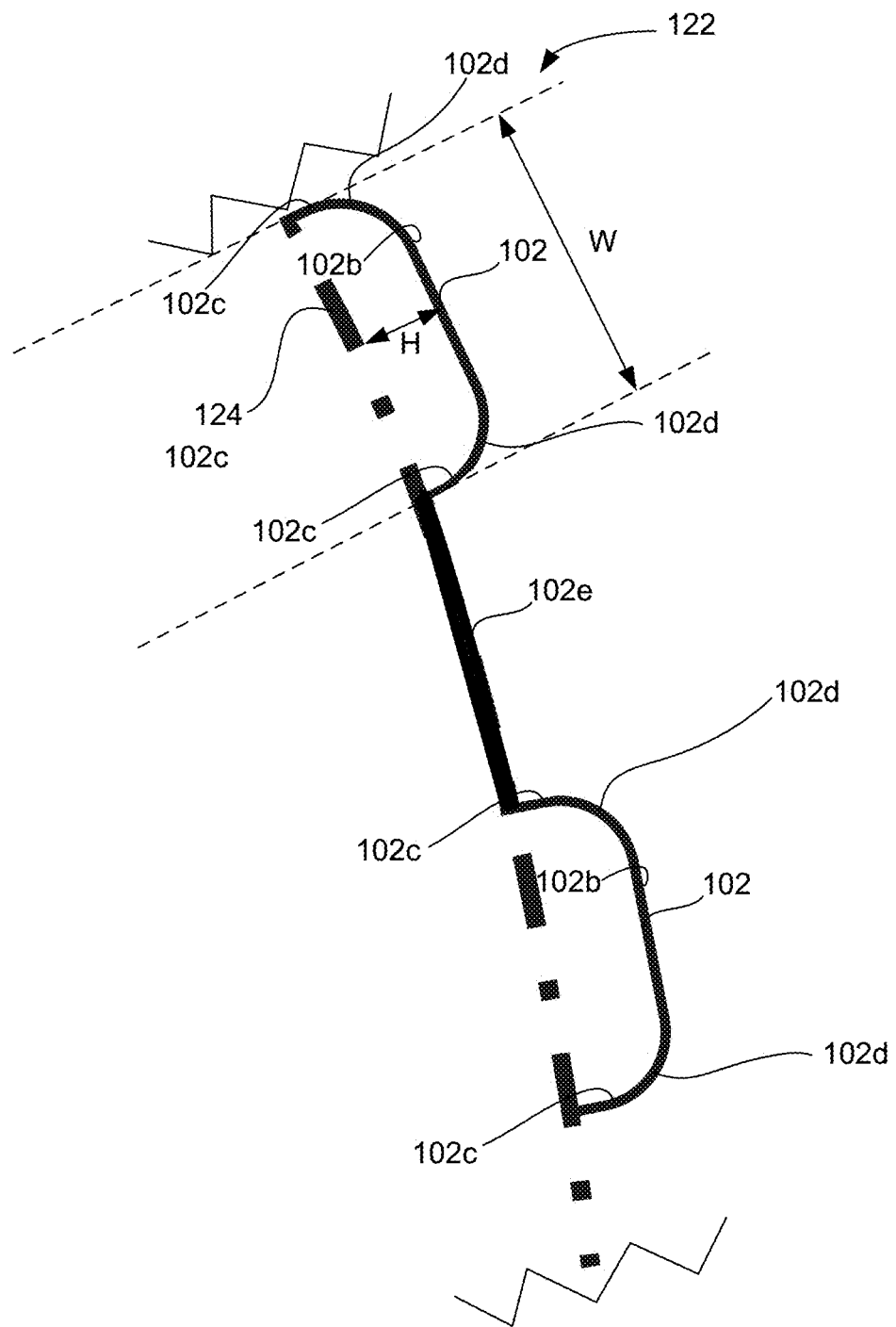
FIG. 6 illustrates a cross-sectional side view of the portion of the curved optical surface shown in the dashed circle labeled with reference numeral 121 in FIG. 1 in accordance with another representative embodiment.

FIG. 6 illustrates a cross-sectional side view of the portion of the curved optical surface 101 shown in the dashed circle labeled with reference numeral 121 in FIG. 1 in accordance with another representative embodiment. In accordance with this representative embodiment, the perturbations 102 are identical to the perturbations 102 shown in FIG. 5 except that they have no substantially flat indented surfaces 102a relative to the dashed curve 124 representing the profile of the curved optical surface 101 shown in FIG. 1 without the perturbations 102 formed therein. Instead, adjacent perturbations 102 are interconnected by a curved surface 102e that has the same curvature as the dashed curve 124 representing the profile of the curved optical surface 101 shown in FIG. 1 without the perturbations 102 formed therein, Each perturbation 102 has side surfaces 102c that are substantially perpendicular to the substantially flat protruding surfaces 102b of the respective perturbation 102. Each perturbation 102 has curved transitioning surfaces 102d that provide relatively smooth transitions between the substantially flat protruding surface 102b and the side surfaces 102c, as needed for manufacturing the lens via a plastic injection molding process. Each perturbation 102 has a width W that ranges from $60\lambda$ to $400\lambda$ and a maximum height H that ranges from 0 to $5\lambda$.

The size, shape and arrangement of the perturbations 102 in the curved optical surface 101 shown in FIG. 6 produces the aforementioned aggregate refractive effect that causes the laser light beam 111 to have a preselected phase distribution at a preselected plane that achieves desired levels of mode matching and back-reflection prevention. As indicated above, the refractive focusing lens 122 comprising the perturbed curved optical surface 101 provides the refractive effect of a typical refractive focusing lens that causes the laser light beam 111 to converge in a predetermined manner to a focal point while the perturbations 102 locally vary the phases of the respective light beam portions as they pass through the respective perturbations 102. The aggregate refractive effect is to provide the laser light beam 111 with a preselected phase distribution at a preselected plane that may be in front of, behind or on the end face 105 of the optical fiber 106, depending on the intended or desired launch condition.

Figure 7:
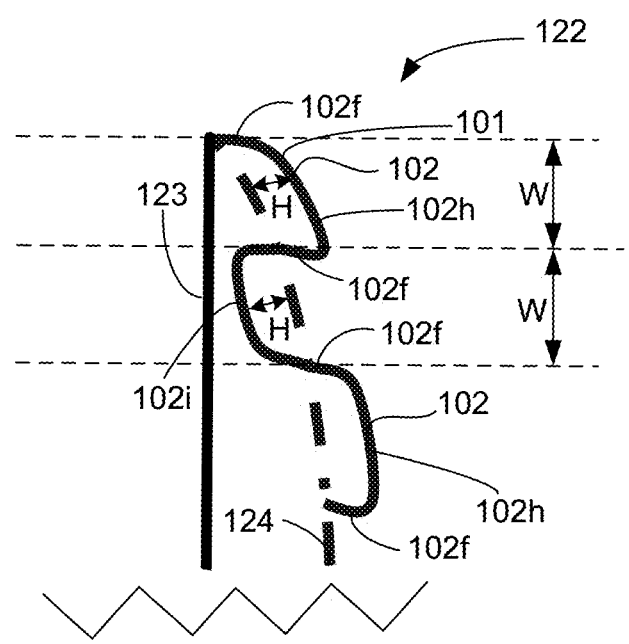
FIG. 7 illustrates a cross-sectional side view of a portion of the refractive focusing lens shown in FIG. 1 in accordance with another representative embodiment.

FIG. 7 illustrates a cross-sectional side view of a portion of the refractive focusing lens 122 shown in FIG. 1 in accordance with another representative embodiment. In accordance with this representative embodiment, the perturbations 102 have side surfaces 102f that are substantially perpendicular to the base 123 of the refractive focusing lens 122. The perturbations 102 have protruding and indented surfaces 102h and 102i, respectively, relative to the dashed curve 124, which represents the profile of the curved optical surface 101 shown in FIG. 1 without the perturbations 102 formed therein. The protruding and indented surfaces 102h and 102i, respectively, are interconnected to one another via the side surfaces 102f. The transitions between the protruding surfaces 102h and the respective side surfaces 102f are relatively smooth, in accordance with this embodiment. Likewise, the transitions between the indented surfaces 102i and the respective side surfaces 102f are relatively smooth, in accordance with this embodiment. Each perturbation 102 has a width W that ranges from $60\lambda$ to $400\lambda$ and a maximum height H that ranges from 0 to $5\lambda$.

The size, shape and arrangement of the perturbations 102 shown in FIG. 7 are preselected to produce the aforementioned aggregate refractive effect that causes the laser light beam 111 (FIG. 1) to have a preselected phase distribution at a preselected plane that achieves desired, predetermined levels of mode matching and back-reflection prevention. As indicated above, the refractive focusing lens 122 comprising the perturbed curved optical surface 101 provides the refractive effect of a typical refractive focusing lens that causes the laser light beam 111 to converge in a predetermined manner to a focal point while the perturbations 102 locally vary the phases of the respective light beam portions as they pass through the respective perturbations 102. The aggregate refractive effect provides the laser light beam 111 with a preselected phase distribution at a preselected plane that is in front of, behind or on the end face 105 of the optical fiber 106, depending on the intended or desired launch condition.

Figure 8:
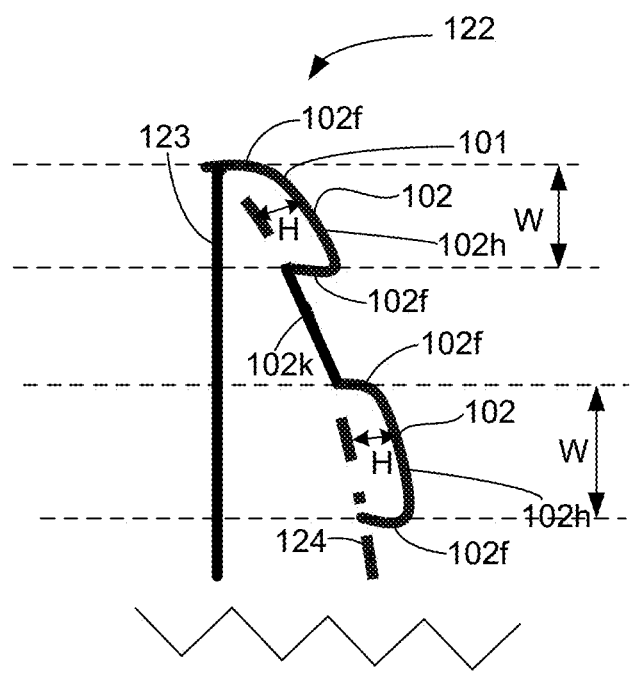
FIG. 8 illustrates a cross-sectional side view of a portion of the refractive focusing lens shown in FIG. 1 in accordance with another representative embodiment.

FIG. 8 illustrates a cross-sectional side view of a portion of the refractive focusing lens 122 shown in FIG. 1 in accordance with another representative embodiment. As with the embodiment shown in FIG. 7, in accordance with this representative embodiment, the perturbations 102 have side surfaces 102f that are substantially perpendicular to the base 123 of the refractive focusing lens 122. Unlike the perturbations 102 shown in FIG. 7 that have protruding and indented surfaces 102h and 102i, respectively, relative to the dashed curve 124 representing the profile of the curved optical surface 101, the perturbations 102 shown in FIG. 8 have protruding surfaces 102h, but do not have the indented surfaces 102i. In FIG. 8, the indented surfaces have been replaced by curved surfaces 102k that have the same curvature as dashed curve 124. In accordance with this embodiment, the transitions between the protruding surfaces 102h and the respective side surfaces 102f are relatively smooth, as needed for manufacturing the lens via a plastic injection molding process. Each perturbation 102 has a width W that ranges from $60\lambda$ to $400\lambda$ and a maximum height H that ranges from 0 to $5\lambda$.

The size, shape and arrangement of the perturbations 102 in the curved optical surface 101 shown in FIG. 8 are preselected to produce the aforementioned aggregate refractive effect that causes the laser light beam 111 to have a preselected phase distribution at a preselected plane that achieves desired levels of mode matching and back-reflection prevention. As indicated above, the refractive focusing lens 122 comprising the perturbed curved optical surface 101 provides the refractive effect of a typical refractive focusing lens that causes the laser light beam 111 to converge in a predetermined manner to a focal point while the perturbations 102 locally vary the phases of the respective light beam portions as they pass through the respective perturbations 102. The aggregate refractive effect is to provide the laser light beam 111 with a preselected phase distribution at a preselected plane that may be in front of, behind or on the end face 105 of the optical fiber 106, depending on the intended or desired launch condition.

The material comprising the perturbed curved optical surface 101 preferably is a plastic optical material such as ULTEM™ polyetherimide, for example, that is transparent to the operating wavelength of light of the optical communications device (not shown) in which the optical coupling system 100 is used. ULTEM™ polyetherimide is a product of Saudi Arabia Basic Industries Corporation (SABIC) of Saudi Arabia. As will be described below in more detail, the perturbed curved optical surface 101 is typically formed via a plastic molding process. Typically, the perturbed curved optical surface 101 is an integral part of the optical coupling system 100 and the optical coupling system 100 is monolithically formed as a unitary piece part, e.g., as a single plastic molded part having the perturbed curved optical surface 101 and other optical components or features integrally formed therein.

Each of the perturbations 102 acts as a respective refractive lens that alters the phase of the portion of the light beam 111 that passes through it. The result is a complex light beam shape, or profile, compared to that which would occur in the absence of the perturbations 102. The complex light beam shape reduces back reflection and also achieves a level of mode matching between the modes of the light beam 111 and the modes of the fiber 106 into which the light beam 111 is coupled, thereby improving forward coupling efficiency and reducing RIN.

In general, the perturbations 102 result in the formation of a predetermined complex light beam shape at a predetermined plane. The plane in which the complex light beam shape occurs is typically, but not necessarily, the same plane in which the end face 105 of the optical fiber 106 lies. The perturbed curved optical surface 101 has a predetermined structure that is designed to achieve the predetermined complex light beam shape at the end face 105 of the optical fiber 106. The term "complex light beam shape," as that term is used herein, denotes a light beam shape made up of at least two light beam portions that are adjacent to one another or overlap one another fully or partially at a predetermined plane to form a light beam shape at the predetermined plane that is different from each of the light beam portions. Each perturbation has a localized refractive effect on a portion of the light beam that is incident on the perturbed curved optical surface 101 to form a respective light beam portion. The perturbations are shaped, sized and positioned such that a predetermined aggregated refractive effect of all of the localized refractive effects forms a complex light beam shape at the predetermined plane.

Figure 9:
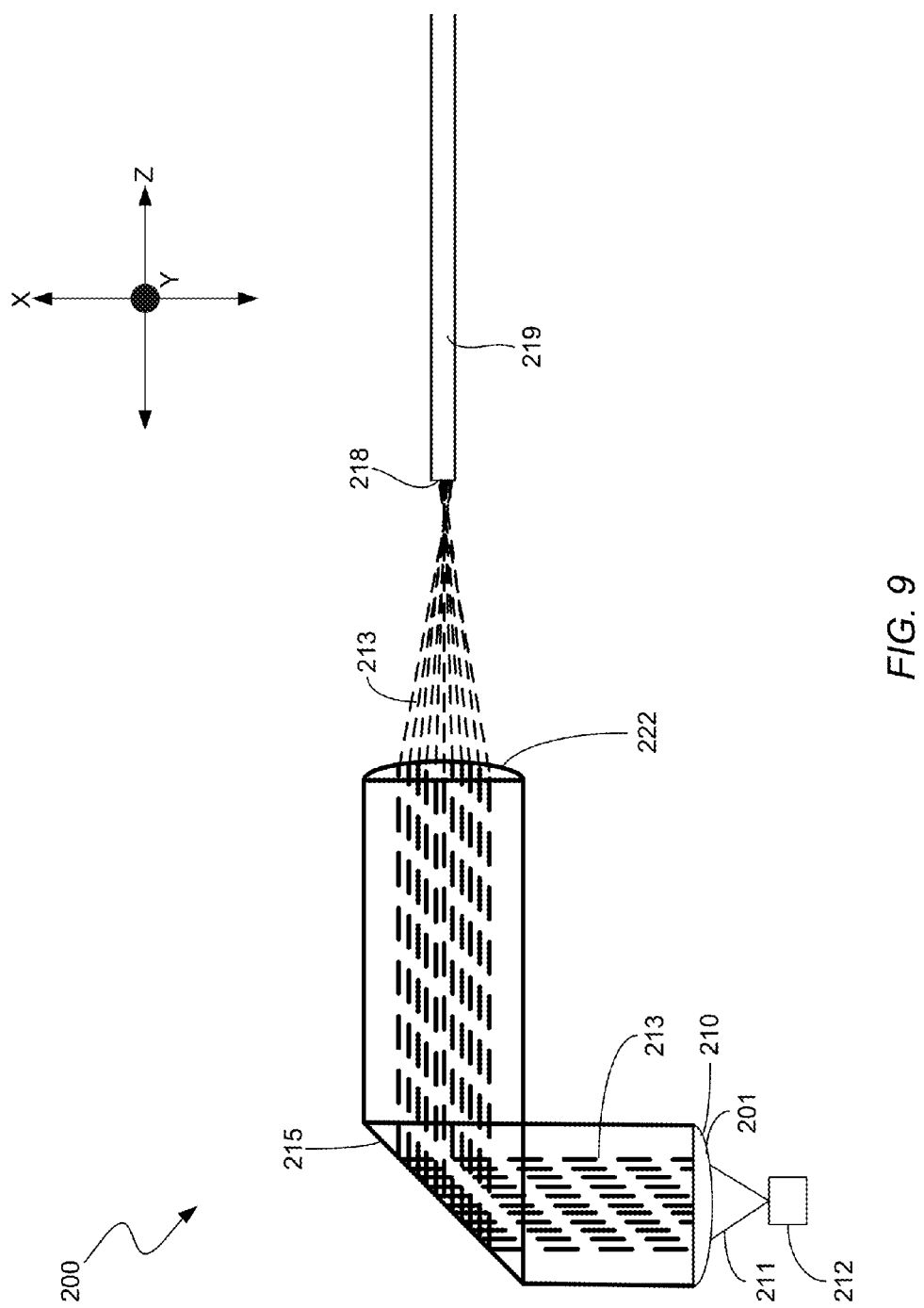
FIG. 9 illustrates a side view of a portion of an optical coupling system in accordance with another representative embodiment having a perturbed curved optical surface formed on an outer side of a refractive collimating lens.

The perturbed curved optical surface may be disposed at any location along the optical pathway of the optical coupling system. For example, FIG. 9 illustrates a side view of a portion of an optical coupling system 200 in accordance with another representative embodiment in which the perturbed curved optical surface 201 is an outer side of a refractive collimating lens 210. The perturbations of the perturbed curved optical surface 201 may have the shape, size and structure of the perturbations 102 described above with reference to FIGS. 1-8. The refractive collimating lens 210 collimates a diverging laser light beam 211 emitted by a laser light source 212 and directs the collimated laser light beam 213 toward a reflector 215. The perturbed curved optical surface 201 has perturbations (not shown) that have the structure, size and shape described above that operate on the diverging laser light beam 211 in the refractive manner described above to form a laser light beam 213 having a complex light beam shape, as that term has been defined above. The laser light beam 213 having the complex light beam shape is incident on the reflector 215, which turns the laser light beam 213 by a non-zero-degree angle (90° in this embodiment) and directs it toward the end face 218 of the optical fiber 219. A refractive focusing lens 222 directs the complex light beam shape onto the end face 218 of the optical fiber 219. Because of the presence of the perturbations on the refractive collimating lens 210, the focused light after being operated on by the refractive focusing lens 222 will be different from the typical focusing effect achieved by a typical collimating lens. The focused beam has the complex light distribution that improves the mode matching between the laser modes and the fiber modes and also reduces back reflection into the laser.

Figure 10:
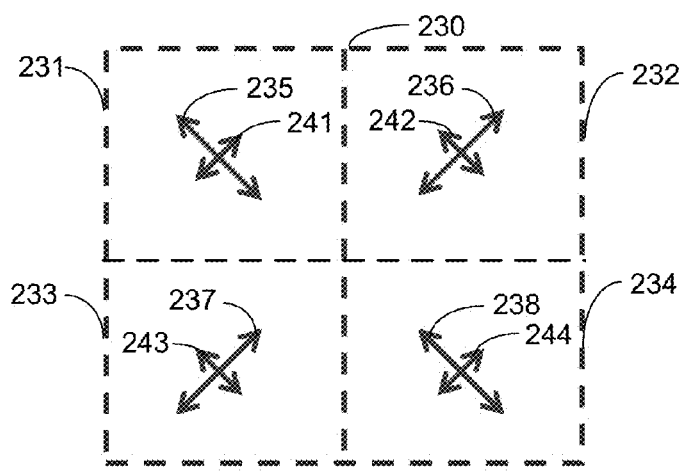
FIG. 10 illustrates a plan view of a perturbed curved optical surface comprising a two-by-two array of perturbations having any of the shapes shown in FIGS. 1-8 in accordance with a representative embodiment.

FIG. 10 illustrates a plan view of a perturbed curved optical surface 230 comprising a two-by-two array of perturbations 231-234 having any of the shapes shown in FIGS. 1-8 in accordance with a representative embodiment. In accordance with this representative embodiment, each of the perturbation 231-234 is a small biconic lens. In this example, the longer arrows 235-238 represent a first curvature of the respective biconic lens and the shorter arrows 241-244 represent a second curvature of the respective biconic lens that is smaller than the first curvature.

Figure 11:
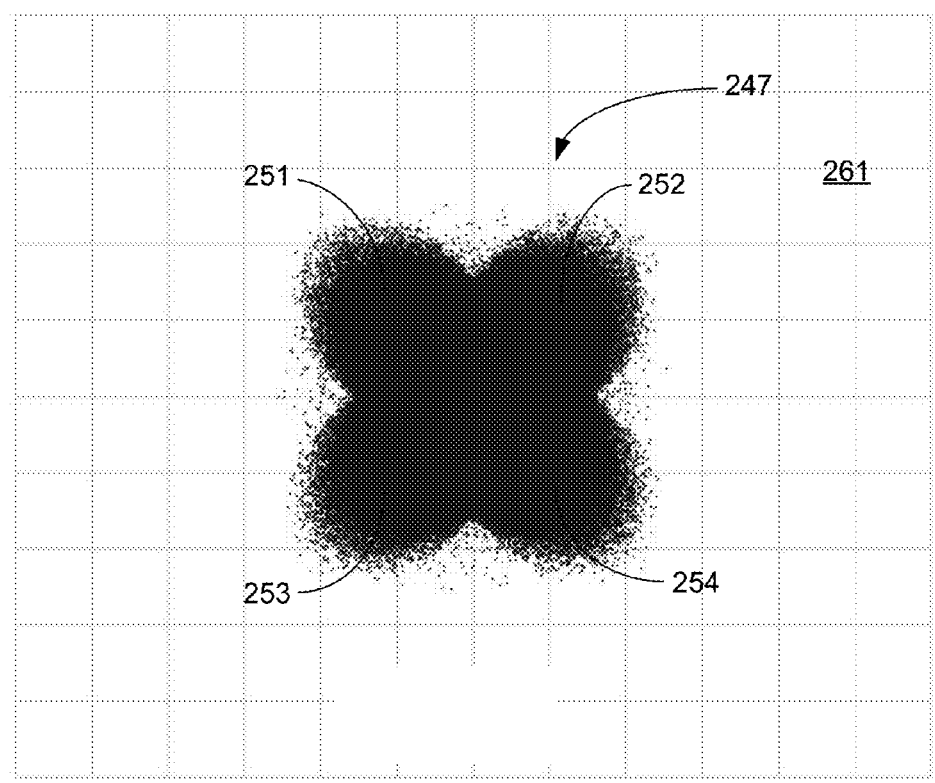
FIGS. 11 and 12 illustrate front plan views of first and second complex light beam shapes, respectively, in first and second planes, respectively.
Figure 12:
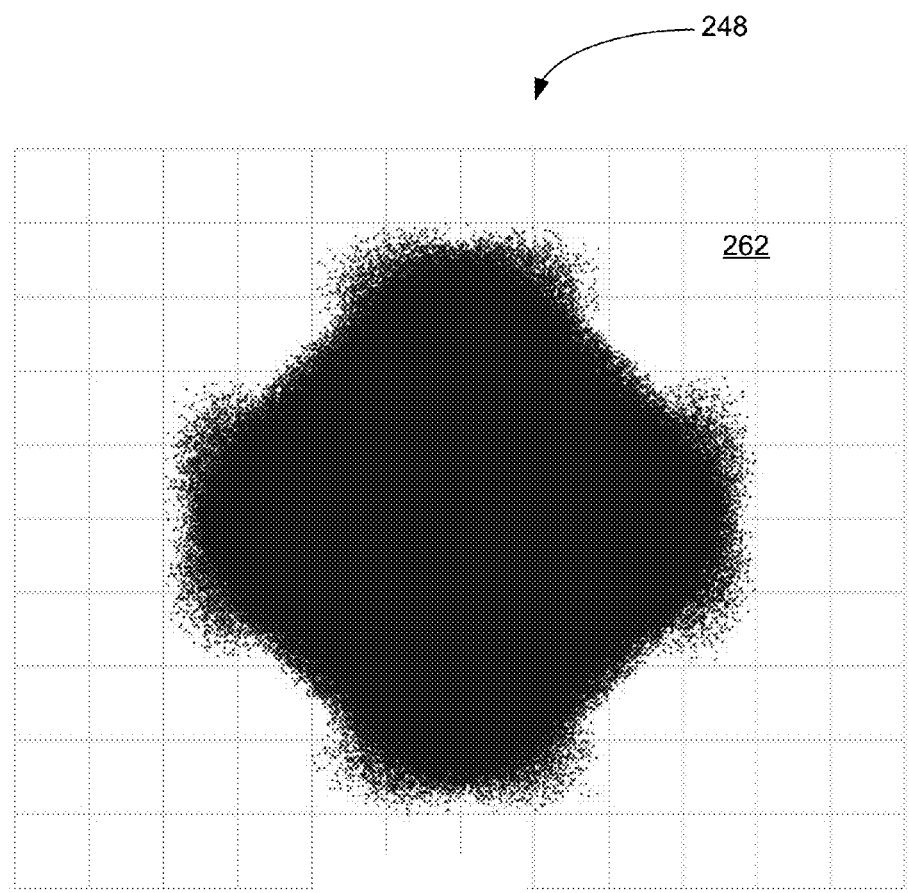

FIGS. 11 and 12 illustrate front plan views of first and second complex light beam shapes 247 and 248, respectively, in first and second planes 261 and 262, respectively. The first and second planes 261 and 262, respectively, are at focus and just beyond focus, respectively. The complex light beam shapes 247 and 248 comprise four light beam portions 251-253 that experience different refractive effects by the four biconic lenses of the two-by-two array of perturbations 231-234 shown in FIG. 10. Because the biconic lenses are at different spatial locations and have different orientations, the respective light beam portions 251-254 are formed at different locations in the first plane 261 at focus. At near focus in the plane 262, the complexity of the complex light beam shape 248 is further increased such that the light beam portions 251-254 are no longer discernible and the overall complex light beam shape 248 is totally different from the typical circular shape of a typical light beam. In order to simply illustrate the effect of the perturbation in this example, the more complicated overlaying pattern caused by the interference between different portions of a coherent laser beam overlapping each other on planes 261 and 262 is not shown.

Ideally, the complex light beam shape that is incident on the end face of the optical fiber has both the spatial and angular distribution of all of the light modes of the optical fiber in order to achieve optimum forward optical coupling efficiency. However, this is very difficult to achieve using typical optical coupling systems. The complex light beam shapes 247 and 248 shown in FIGS. 11 and 12, respectively, are predetermined to have spatial and angular distributions at the fiber end face that match enough of the light modes of the optical fiber to achieve good forward optical coupling efficiency. Thus, the size, shape and spatial arrangement of the perturbations 102 (FIGS. 1-8) in the curved optical surface 101 are preselected to obtain a complex light beam shape at a preselected plane that is coplanar, or at least substantially coplanar, with the fiber end face and that is at or near focus in order to match spatial and angular distributions of the optical fiber light modes, thereby achieving good forward optical coupling efficiency and reduced RIN. In addition, any of the light comprising the complex light beam shape that is back reflected from the end face of the fiber experiences a different reverse optical path compared to the forward optical path, which prevents the back reflected light from being coupled into the laser light source 104.

In most embodiments, the size, shape and spatial arrangement of the perturbations 102 are preselected to obtain a complex light beam shape at a preselected plane that is coplanar with the fiber end face and that is near focus, but not at focus, in order to match spatial and angular distributions of the optical fiber light modes, thereby achieving good forward optical coupling efficiency and reduced RIN. For example, the complex light beam shape 248 shown in FIG. 12, which is near focus, has a more complicated spatial distribution than the complex light beam shape 247 shown in FIG. 11. The more complicated light beam shape 248 at near focus can excite more of the optical fiber light modes than the less complicated light beam shape 247 at focus.

While the optical coupling system 100 is an example of a structure that can incorporate the perturbed curved optical surface 101, the perturbed curved optical surface 101 is not limited with respect to the structure or configuration of the optical coupling system in which it is incorporated. For example, while the optical coupling system 100 shown in FIG. 1 is configured with a collimating lens 109 that converts the diverging laser light beam 108 into the collimated laser light beam 111, which is then coupled by the reflector 112 onto the perturbed curved optical surface 101, the perturbed curved optical surface 101 may operate on a non-collimated light beam, such as a diverging or converging light beam.

The perturbed curved optical surface 101 is typically manufactured using the same type of known plastic molding process that is used to manufacture known plastic lenses. The perturbations 102 are sufficiently large that they can be precisely formed via a known plastic molding process. Diffractive or holographic surfaces having diffractive or holographic elements formed therein are often used to couple light from a laser light source onto an end face of an optical fiber in a way that attempts to match the spatial and angular distribution of the coupled beam to multiple light modes of the optical fiber. However, because the widths of the diffractive or holographic features must be comparable to the operating wavelength, these features are generally too small to be formed by known plastic molding processes. Instead, such diffractive or holographic surfaces are typically formed using glass etching techniques or photolithographic techniques, which are relatively expensive to perform. In contrast, because the perturbations 102 are relatively large compared to diffractive or holographic elements, the perturbed curved optical surface 101 can be formed during a known plastic molding process that is used to manufacture the entire optical coupling system 100. Such known molding processes are relatively inexpensive to perform. As indicated above, the molding process results in the perturbations 102 having a width that ranges from 60$\lambda$ to 400$\lambda$ and a maximum height that ranges from 0 to 5$\lambda$. Therefore, the perturbations 102 are too large to have a diffractive effect on the incident light beam and instead have a refractive effect on the incident light beam. In other words, each perturbation 102 has a localized refractive effect on a respective portion of the incident light beam, and the aggregated refractive effect of all of the perturbations 102 on the incident light beam is the formation of the aforementioned predetermined complex light beam shape on the end face 105 of the optical fiber 106 that reduces back reflection and increases forward optical coupling efficiency through improved mode matching.

It should be noted that the invention has been described with reference to a few representative embodiments for the purposes of demonstrating the inventive principles and concepts. For example, while the representative embodiments describe particular complex light beam shapes 247 and 248 at a predetermined plane 261 and 262, respectively, at or near focus, respectively, the inventive principles and concepts are not limited to these particular complex light beam shapes. Persons of skill in the art will understand, in view of the description provided herein, the manner in which a perturbed curved optical surface can be designed and manufactured to achieve any desired complex light beam shape tailored to match the angular and spatial distributions of light modes of the optical fiber with which the perturbed curved optical surface is being used. Therefore, the inventive principles and concepts are not limited to the representative embodiments, as will be understood by persons of ordinary skill in the art in view of the description provided herein. Those skilled in the art will understand that modifications may be made to the embodiments described herein and that all such modifications are within the scope of the invention.

What is claimed is:

1. An optical coupling system for use in an optical communications module for coupling light into an end face of an optical waveguide, the optical coupling system comprising:
   a curved optical surface positioned along an optical pathway of the optical coupling system, the curved optical surface having a base and an outer side, wherein a light beam generated by a light source and propagating along the optical pathway in a first direction is incident on the curved optical surface; and
   a plurality of perturbations disposed on the outer side of the curved optical surface, each perturbation having a localized refractive effect on a portion of the light beam that is incident on the curved optical surface to form a respective light beam portion at a predetermined plane, wherein the perturbations are shaped, sized and positioned such that a predetermined aggregated refractive effect of partially or fully overlapping all of the respective light beam portions at the predetermined plane forms a complex light beam shape at the predetermined plane that is different in shape from respective shapes of each of the respective light beam portions, the complex light beam shape being preselected to match a spatial and angular distribution of a plurality of light modes of the optical waveguide.

2. The optical coupling system of claim 1, wherein the complex light beam shape is also preselected to reduce an amount of light reflected from an end face of the optical waveguide and coupled into an aperture of the light source.

3. The optical coupling system of claim 1, wherein said plurality of perturbations are positioned in a 1-by-N array on the outer side of the curved optical surface, where N is a positive integer that is greater than or equal to 2.

4. The optical coupling system of claim 1, wherein said plurality of perturbations are positioned in an M-by-N array on the outer side of the curved optical surface, where M and N are positive integers that are greater than or equal to 2.

5. The optical coupling system of claim 1, wherein each of the perturbations has a predetermined width in a direction that is transverse to the first direction, the predetermined width being sufficiently great that the perturbations have no diffractive effect on the light beam that is incident on the curved optical surface.

6. The optical coupling system of claim 5, wherein the predetermined width ranges from about 60$\lambda$ to 400$\lambda$, where $\lambda$ is an operating wavelength of the optical communications module in which the optical coupling system is used.

7. The optical coupling system of claim 6, wherein each of the perturbations has a predetermined maximum height equal to a distance from the outer side of the curved optical surface in a third direction that is normal to the base of the curved optical surface, the height ranging from about 0 to 5$\lambda$.

8. The optical coupling system of claim 7, wherein the optical coupling system is formed as a unitary, molded plastic piece part having the curved optical surface integrally formed therein.

9. The optical coupling system of claim 8, wherein the predetermined width is equal for all of the perturbations.

10. The optical coupling system of claim 9, wherein the predetermined maximum height is equal for all of the perturbations.

11. The optical coupling system of claim 10, wherein the perturbations extend only over a portion of the outer side of the curved optical surface that intersects the optical pathway.

12. The optical coupling system of claim 8, wherein the predetermined width is unequal for at least some of the perturbations.

13. The optical coupling system of claim 12, wherein the predetermined maximum height is unequal for at least some of the perturbations.

14. The optical coupling system of claim 4, wherein each of the perturbations is a biconic lens.

15. The optical coupling system of claim 1, wherein the curved optical surface comprises an air-to-material interface of the optical coupling system such that the outer side of the curved optical surface is in contact with air and the base of the curved optical surface is inside of material comprising the optical coupling system, wherein the light beam propagating along the optical pathway in the first direction passes from the air into the material at the air-to-material interface.

16. The optical coupling system of claim 1, wherein the curved optical surface comprises a material-to-air interface of the optical coupling system such that the outer side of the curved optical surface is in contact with air and the base of the curved optical surface is inside of material comprising the optical coupling system, wherein the light beam propagating along the optical pathway in the first direction passes from the material into the air at the material-to-air interface.

17. A method for launching light produced by a light source into an end face of an optical waveguide, the method comprising:
   with a light source, producing a light beam; and
   with an optical coupling system, receiving the light beam and guiding the light beam in a first direction along an optical pathway of the optical coupling system and causing the light beam to be incident on a curved optical surface of the optical coupling system, wherein a plurality of perturbations are disposed on an outer side of the curved optical surface, each perturbation having a localized refractive effect on a portion of the light beam that is incident on the curved optical surface to form a respective light beam portion at a predetermined plane, wherein the perturbations are shaped, sized and positioned such that a predetermined aggregated refractive effect of partially or fully overlapping all of the respective light beam portions at the predetermined plane forms a complex light beam shape at the predetermined plane that is different in shape from a respective shape of each of the respective light beam portions, the complex light beam shape being preselected to match a spatial and angular distribution of a plurality of light modes of the optical waveguide.

18. The method of claim 17, wherein each of the perturbations has a predetermined width in a second direction that is transverse to the first direction, the predetermined width ranging from about 60$\lambda$ to 400$\lambda$, where $\lambda$ is an operating wavelength of an optical communications module in which the optical coupling system is used.

19. The method of claim 18, wherein each of the perturbations has a predetermined maximum height equal to a distance from the outer side of the curved optical surface in a third direction that is normal to a base of the curved optical surface, the maximum height ranging from about 0 to 5$\lambda$.

20. An optical coupling system for use in an optical communications module comprising:
   a curved optical surface positioned along an optical pathway of the optical coupling system, the curved optical surface having a base and an outer side, wherein a light beam generated by a light source and propagating along the optical pathway in a first direction is incident on the curved optical surface; and
   a plurality of perturbations disposed on the outer side of the curved optical surface, each perturbation having a localized refractive effect on a portion of the light beam that is incident on the curved optical surface to form a respective light beam portion at a predetermined plane, wherein the perturbations are shaped, sized and positioned such that a predetermined aggregated refractive effect of partially or fully overlapping all of the respective light beam portions at the predetermined plane forms a complex light beam shape at the predetermined plane that is different in shape from respective shapes of each of the respective light beam portions, the complex light beam shape being preselected to reduce an amount of light reflected from an end face of an optical waveguide coupled to the optical communications module that is incident on an aperture of the light source.

* * * * *